United States Patent [19]
Aoki et al.

[11] Patent Number: 5,886,100
[45] Date of Patent: Mar. 23, 1999

[54] THERMOSETTING COATING COMPOSITION

[75] Inventors: Katsutoshi Aoki; Yukiya Sato; Masayuki Maruta; Yasunori Inagaki; Kuniyasu Kawabe, all of Wakayama, Japan

[73] Assignee: KAO Corporation, Tokyo, Japan

[21] Appl. No.: 812,941

[22] Filed: Mar. 4, 1997

[30] Foreign Application Priority Data

Mar. 4, 1996 [JP] Japan ................................. 8-075252

[51] Int. Cl.$^6$ ........................... C08L 67/02; C08L 77/00; C08L 77/12
[52] U.S. Cl. .................... 525/101; 525/111; 525/113; 525/124; 525/167; 525/170; 525/176; 525/181; 525/183; 525/426; 525/445; 525/934; 524/513; 524/514; 427/385.5; 427/458; 427/459; 427/481; 427/485
[58] Field of Search .................... 525/111, 124, 525/170, 176, 934, 10, 101, 113, 167, 183, 181, 426, 445; 427/385.5, 458, 459, 461, 485; 524/513, 514

[56] References Cited

U.S. PATENT DOCUMENTS

| | | | |
|---|---|---|---|
| 4,352,924 | 10/1982 | Wooten et al. | |
| 4,835,228 | 5/1989 | Hefner | 525/524 |
| 5,326,821 | 7/1994 | Sasaki | 525/124 |
| 5,344,883 | 9/1994 | Loar | 525/170 |
| 5,494,994 | 2/1996 | Gras | 525/438 |
| 5,593,730 | 1/1997 | Satgurunathan | 525/176 |

*Primary Examiner*—Patricia A. Short
*Attorney, Agent, or Firm*—Birch, Stewart, Kolasch & Birch, L.L.P.

[57] ABSTRACT

The thermosetting coating composition in a powdery form, includes (a) a binder resin prepared by the steps comprising preparing a starting material monomer mixture of two different polymerization reactions, each of the polymerization reaction being carried out in an independent reaction path, and then concurrently carrying out both of the two different polymerization reactions in one reaction vessel; (b) a colorant; and (c) a crosslinking agent. The coating film is prepared by curing the above thermosetting coating composition.

14 Claims, No Drawings

THERMOSETTING COATING COMPOSITION

BACKGROUND OF THE INVENTION

1. Field of the Invention

The present invention relates to a thermosetting coating composition in a powdery form, and a coating film prepared by curing the above coating composition. More specifically, the present invention relatives to a thermosetting coating composition in a powdery form comprising, as the main components, two or more resinous components chemically bonded to each other or suitably dispersed therein, and a coating film prepared by curing the above coating composition.

2. Discussion of the Related Art

The resin materials usable in the preparation of powder coating may be roughly classified to thermosetting resins and thermoplastic resins. When a thermoplastic powder coating is applied, heat is supplied to a powder coating on the base material (undercoating), to thereby melt particles of the powder coating, so that the particles are made flowable to form a levelled coating film.

On the other hand, when compared to coating films prepared from a thermoplastic resin, a coating film prepared from a thermosetting resin is generally more tough and more resistant to solvents and detergents, and shows better adhesion to metal base materials, so that the coating film prepared from a thermosetting resin does not undergo softening when exposed at a high temperature. However, aside from the desired properties mentioned above, the curing of the thermosetting resin coating film gives rise to the following problems in order to obtain a coating film having good levelling property and flexibility.

In other words, the coating films prepared from the thermosetting resin powders are likely to be cured or solidified upon heat application before the formation of a levelled coating film, thereby giving a relatively rough finish which is often referred to as "orange peel" surface. In such a case, the coating film substantially has no gloss or luster on the orange peel surface. In order to solve the problem of the orange peel surface, proposals have been made to use thermosetting resin coatings using an organic solvent as a dilution agent. However, in these thermosetting resin coatings, the organic solvents are evaporated and released to the air, which gives rise to undesirable environmental and safety problems.

Besides having good gloss, high impact strength, and high resistance to solvents and chemicals, the coating films prepared from the thermosetting resin coatings have to have excellent flexibility. For instance, metallic sheets are designed to be molded by deflection or bending at various angles in the manufacturing of automobiles, etc., and it is essential to have good flexibility in the thermosetting resin coating film.

In order to meet such demands, U.S. Pat. No. 4,352,924, of which the disclosure is incorporated herein by reference, discloses a particular crystalline polyester useful for the powder coating composition. Also, WO 89/65320, of which the disclosure is incorporated herein by reference, discloses a powder coating composition comprising an amorphous polyester, a semi-crystalline polyester, and a polyisocyanate crosslinking agent.

However, coating films prepared from these powder coating compositions disclosed above do not have a sufficient level of weatherability.

An object of the present invention is to provide a thermosetting coating composition which gives excellent gloss, levelling property, chroma, and weatherability in the resulting coating film prepared therefrom, and also gives an excellent storage stability in the resulting coating.

Another object of the present invention is to provide a coating film prepared from the above thermosetting coating composition.

These and other objects of the present invention will be apparent from the following description.

SUMMARY OF THE INVENTION

As a result of intensive research in view of the above objects, the present inventors have found that a desired coating film may be prepared from a thermosetting coating composition containing a particular binder resin. The present invention has been completed based upon these findings.

In one aspect, the present invention is concerned with a thermosetting coating composition in a powdery form, at least comprising:

(a) a binder resin prepared by the steps comprising preparing a starting material monomer mixture of two different polymerization reactions, each of the polymerization reaction being carried out in an independent reaction path, and then concurrently carrying out both of the two different polymerization reactions in one reaction vessel;

(b) a colorant; and (c) a crosslinking agent.

In another aspect, the present invention is concerned with a coating film prepared by curing the thermosetting coating composition mentioned above.

DETAILED DESCRIPTION OF THE INVENTION

The present invention will be explained in detail below.

The thermosetting coating composition of the present invention in a powdery form at least comprises:

(a) a binder resin prepared by the steps comprising preparing a starting material monomer mixture of two different polymerization reactions, each of the polymerization reaction being carried out in an independent reaction path, and then concurrently carrying out both of the two different polymerization reactions in one reaction vessel;

(b) a colorant; and (c) a crosslinking agent.

First, the binder resin mentioned above will be explained.

The binder resin usable in the thermosetting coating composition of the present invention may be prepared by the steps comprising preparing a starting material monomer mixture of two different polymerization reactions, each of the polymerization reaction being carried out in an independent reaction path, and then concurrently carrying out both of the two different polymerization reactions in one reaction vessel.

The two different polymerization reactions which are each carried out in an independent reaction path may be addition polymerization reaction and condensation polymerization reaction.

In a preferred embodiment, the addition polymerization reaction is to produce vinyl resins by radical polymerization, and the condensation polymerization reaction is to produce one or more polymers selected from the group consisting of polyesters, polyesteramides, and polyamides obtained by the condensation polymerization.

Also, in the present invention, it is preferred that a starting material monomer mixture contains a compound which is able to react with both of the starting material monomers of the addition polymerization reaction and the starting material monomers of the condensation polymerization reaction, from the aspect of obtaining a levelled coating film.

Therefore, it is particularly preferred that the binder resin in the present invention is prepared by the steps comprising preparing a mixture comprising condensation polymerization starting material monomers, addition polymerization starting material monomers, and a compound which is able to react with the both kinds of above starting material monomers, and concurrently carrying out both of the two different polymerization reactions in one reaction vessel.

The condensation polymerization resins usable in the present invention include one or more polymers selected from the group consisting of polyesters, polyesteramides, and polyamides.

Therefore, the starting material monomers for the condensation polymerization resins are not particularly limited, as long as these resins are obtained by condensation polymerization.

The polyesters can be formed by condensation polymerization between starting material monomers of an alcohol and a carboxylic acid, a carboxylic acid anhydride or a carboxylic acid ester.

Examples of the dihydric alcohol components include bisphenol A alkylene oxide adducts such as polyoxypropylene(2.2)-2,2-bis(4-hydroxyphenyl)propane, polyoxypropylene(3.3)-2,2-bis(4-hydroxyphenyl)propane, polyoxyethylene(2.0)-2,2-bis(4-hydroxyphenyl)propane, polyoxyethylene(2.2)-2,2-bis(4-hydroxyphenyl)propane, polyoxypropylene(2.0)-polyoxyethylene(2.0)-2,2-bis(4-hydroxyphenyl)propane, and polyoxypropylene(6)-2,2-bis(4-hydroxyphenyl)propane; ethylene glycol, diethylene glycol, triethylene glycol, 1,2-propylene glycol, 1,3-propylene glycol, 1,4-butanediol, neopentyl glycol, 1,4-butenediol, 1,5-pentanediol, 1,6-hexanediol, 1,4-cyclohexanedimethanol, dipropylene glycol, polyethylene glycol, polypropylene glycol, polytetramethylene glycol, bisphenol A, hydrogenated bisphenol A, and other dihydric alcohol components.

Among these dihydric alcohol components, preference is given to bisphenol A alkylene oxide adducts, ethylene glycol, 1,2-propylene glycol, 1,3-propylene glycol, and neopentyl glycol.

Examples of the trihydric or higher polyhydric alcohol components include sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, 2-methylpropanetriol, 2-methyl-1,2,4-butanetriol, trimethylolethane, trimethylolpropane, 1,3,5-trihydroxymethylbenzene, and other trihydric or higher polyhydric alcohol components.

Among these trihydric or higher polyhydric alcohol components, preference is given to glycerol and trimethylolpropane.

In the present invention, these dihydric alcohol components and trihydric or higher polyhydric alcohol components may be used singly or in combination.

Also, examples of the dicarboxylic acid components include maleic acid, fumaric acid, citraconic acid, itaconic acid, glutaconic acid, phthalic acid, isophthalic acid, terephthalic acid, succinic acid, adipic acid, sebacic acid, azelaic acid, malonic acid, n-dodecenyl succinic acid, isododecenyl succinic acid, n-dodecyl succinic acid, isododecyl succinic acid, n-octenyl succinic acid, n-octyl succinic acid, isooctenyl succinic acid, isooctyl succinic acid, and acid anhydrides thereof, lower alkyl esters thereof, and other dicarboxylic acid components.

Among these dicarboxylic acid components, preference is given to maleic acid, fumaric acid, terephthalic acid, adipic acid, and alkenyl succinic acids.

Examples of the tricarboxylic or higher polycarboxylic acid components include 1,2,4-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, 1,2,4-cyclohexanetricarboxylic acid, tetra(methylenecarboxyl)methane, 1,2,7,8-octanetetracarboxylic acid, pyromellitic acid, Empol trimer acid, and acid anhydrides thereof, lower alkyl esters thereof, and other tricarboxylic or higher polycarboxylic acid components. Among these tricarboxylic or higher polycarboxylic acid components, in particular, 1,2,4-benzenetricarboxylic acid, namely trimellitic acid, or a derivative thereof is preferably used because it is inexpensive and the reaction control is easy.

In the present invention, these dicarboxylic acid components and trihydric or higher polycarboxylic acid components may be used singly or in combination.

The starting material monomers for forming amide components are necessary for the starting material monomers for the polyesteramides or the polyamides, aside from the starting material monomers listed above. Examples of the starting material monomers for forming amide components include polyamines such as ethylenediamine, pentamethylenediamine, hexamethylenediamine, diethylenetriamine, iminobispropylamine, phenylenediamine, xylylenediamine, and triethylenetetramine; amino carboxylic acids such as 6-aminocaproic acid and ε-caprolactam; and amino alcohols such as propanolamine. Among these starting material monomers for forming the amide components, preference is given to hexamethylenediamine and ε-caprolactam.

Incidentally, the starting material monomers listed above include some of which usually classified as ring-opening polymerization monomers. However, since these monomers also undergo condensation by hydrolysis in the presence of water formed in the condensation reaction of other monomers, they may be considered as starting material monomers for the condensation polymerization resin in a broad sense.

Examples of the monomers used for forming the vinyl resins obtained by the addition polymerization in the present invention include styrene and styrene derivatives such as styrene, o-methylstyrene, m-methylstyrene, p-methylstyrene, α-methylstyrene, p-ethylstyrene, 2,4-dimethylstyrene, p-chlorostyrene, and vinylnaphthalene; ethylenic unsaturated monoolefins such as ethylene, propylene, butylene, and isobutylene; vinyl esters such as vinyl chloride, vinyl bromide, vinyl fluoride, vinyl acetate, vinyl propionate, vinyl formate, and vinyl caproate; ethylenic esters thereof such as methyl acrylate, ethyl acrylate, n-propyl acrylate, isopropyl acrylate, n-butyl acrylate, isobutyl acrylate, tert-butyl acrylate, amyl acrylate, cyclohexyl acrylate, n-octyl acrylate, isooctyl acrylate, decyl acrylate, lauryl acrylate, 2-ethylhexyl acrylate, stearyl acrylate, methoxyethyl acrylate, 2-hydroxyethyl acrylate, glycidyl acrylate, 2-chloroethyl acrylate, phenyl acrylate, methyl α-chloroacrylate, methyl methacrylate, ethyl methacrylate, n-propyl methacrylate, isopropyl methacrylate, n-butyl methacrylate, isobutyl methacrylate, tert-butyl methacrylate, amyl methacrylate, cyclohexyl methacrylate, n-octyl methacrylate, isooctyl methacrylate, decyl methacrylate, lauryl methacrylate, 2-ethylhexyl methacrylate, stearyl methacrylate, methoxyethyl methacrylate, 2-hydroxyethyl methacrylate, glycidyl methacrylate, phenyl methacrylate, dimethylaminoethyl methacrylate, and diethylaminoethyl methacrylate; vinyl ethers such as vinyl methyl ether; vinylidene halides such as vinylidene chloride; and N-vinyl compounds such as N-vinylpyrrole and N-vinylpyrrolidone.

Among these starting material monomers for the vinyl resins, preference is given to styrene, α-methylstyrene, propylene, methyl acrylate, butyl acrylate, 2-ethylhexyl acrylate, stearyl acrylate, methyl methacrylate, butyl methacrylate, and 2-hydroxyethyl methacrylate.

The polymerization initiators may be used in the polymerization of the starting material monomers of the vinyl resins. Examples of the polymerization initiators include azo and diazo polymerization initiators such as 2,2'-azobis(2,4-dimethylvaleronitrile), 2,2'-azobisisobutyronitrile, 1,1'-azobis(cyclohexane-1-carbonitrile), and 2,2'-azobis-4-methoxy-2,4-dimethylvaleronitrile, and peroxide polymerization initiators such as benzoyl peroxide, methyl ethyl ketone peroxide, isopropyl peroxycarbonate, cumene hydroperoxide, 2,4-dichlorobenzoyl peroxide, lauroyl peroxide, and dicumyl peroxide.

For the purposes of controlling the molecular weight or molecular weight distribution of the polymer, or controlling the reaction time, two or more polymerization initiators may be used in combination.

The amount of the polymerization initiator used is preferably from 0.1 to 20 parts by weight, more preferably from 1 to 10 parts by weight, based on 100 parts by weight of the starting material monomers of the vinyl resins.

In the present invention, it is preferred to use a compound which reacts with both of the starting material monomers for the condensation polymerization resins and for the vinyl resins (hereinafter simply referred to as "dually reactive compound"). Examples of the dually reactive compounds include compounds represented by the general formula (I) shown below:

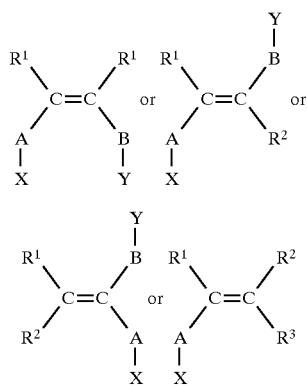

wherein $R^1$, $R^2$ and $R^3$, which may be identical or different, each represents hydrogen atom, hydroxyl group, an alkyl group, an alkoxyl group, an aryl group, a vinyl group, or a halogen atom, which may together form a ring, each of the alkyl group, the alkoxyl group, the aryl group, the vinyl group, or the ring being substituted or unsubstituted; A and B, which may be identical or different, each represents a single bond or an alkylene group represented by the following general formula (II) or a phenylene group represented by the following general formula (III):

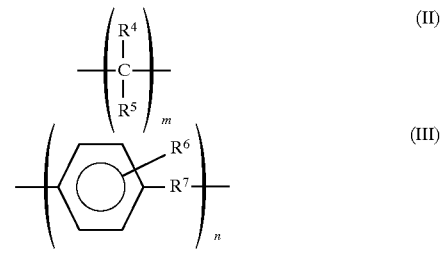

wherein $R^4$, $R^5$ and $R^6$, which may be identical or different, each represents hydrogen atom, hydroxyl group, an alkyl group, an alkoxyl group, an aryl group, a vinyl group, or a halogen atom, wherein $R^4$ and $R^5$ may together form a ring, each of the alkyl group, the alkoxyl group, the aryl group, the vinyl group, or the ring being substituted or unsubstituted; $R^7$ represents a single bond or a lower alkylene group; and m is an integer of 0 to 5; and n is an integer of 0 to 2, and wherein X and Y, which may be identical or different, each represents —$R^8$, —$OR^9$, or —$COOR^{10}$, wherein $R^8$, $R^9$, and $R^{10}$ independently represent hydrogen atom or a substituted or unsubstituted lower alkyl group.

Here, the dually reactive compounds mentioned above need to react with both of the starting material monomers for the condensation polymerization resins and the addition polymerization resins. When two or more starting material monomers for one polymerization reaction are used, a compound may be reactive with at least one of these starting material monomers.

In the general formula (I), with respect to the groups represented by $R^1$ to $R^6$, the alkyl groups, which may be linear or branched, have carbon atoms of preferably 1 to 6, particularly 1 to 4. Examples thereof include methyl group, ethyl group, n-propyl group, i-propyl group, n-butyl group, and tert-butyl group. These alkyl groups may be substituted with such groups as phenyl group, naphthyl group, and hydroxyl group. Examples of the alkoxyl groups include methoxy group, ethoxy group, n-propoxy group, i-propoxy group, and t-butoxy group, which may be substituted with such groups as hydroxyl group and carboxyl group. Examples of the aryl groups include phenyl group, naphthyl group, and benzyl group, which may be substituted with such groups as methyl group, ethyl group, methoxy group, ethoxy group, carboxyl group, and hydroxyl group. The vinyl group may be substituted with such groups as hydroxyl group, phenyl group, an alkyl group, an alkoxyl group, and carboxyl group. The ring formed together by the groups represented by $R^1$ and $R^2$, or by $R^2$ and $R^3$ or by $R^4$ and $R^5$ may be substituted by such groups as hydroxyl group and carboxyl group. Examples of the halogen atoms include fluorine atom, chlorine atom, bromine atom, and iodine atom, with a particular preference given to the chlorine atom and the bromine atom.

The lower alkylene group represented by $R^7$ preferably has 1 to 4 carbon atoms. The lower alkyl groups represented by $R^8$, $R^9$, and $R^{10}$ preferably have 1 to 4 carbon atoms, and examples thereof include methyl group and ethyl group, and the alkyl groups may be substituted with such a group as hydroxyl group.

Typical examples of the compounds represented by the general formula (I) include Compounds (1) to (35) shown below:

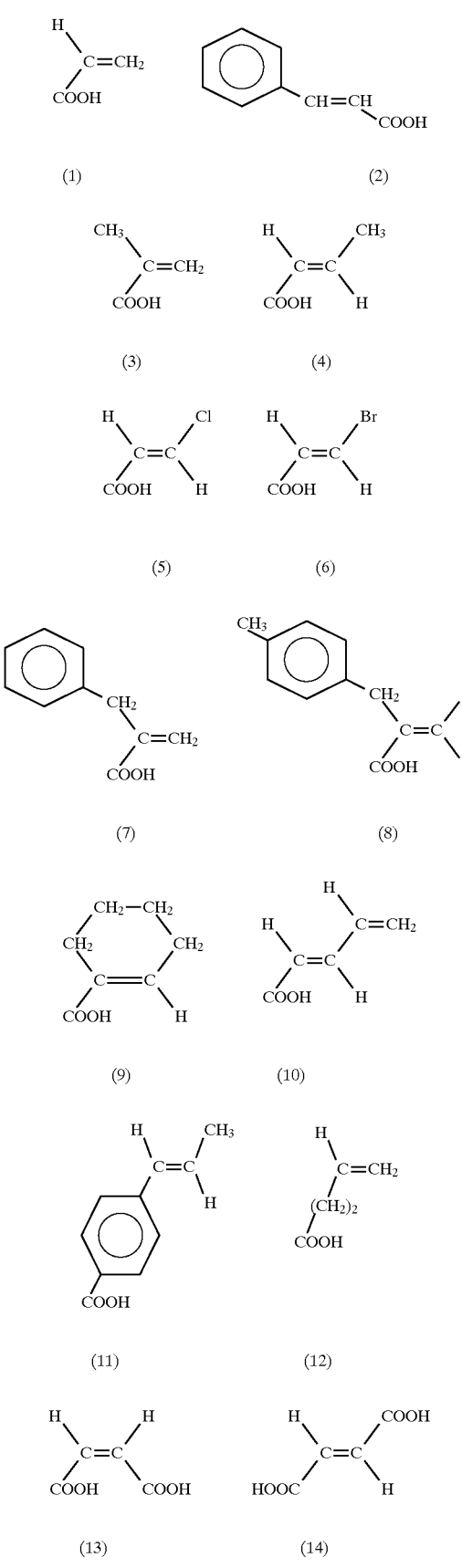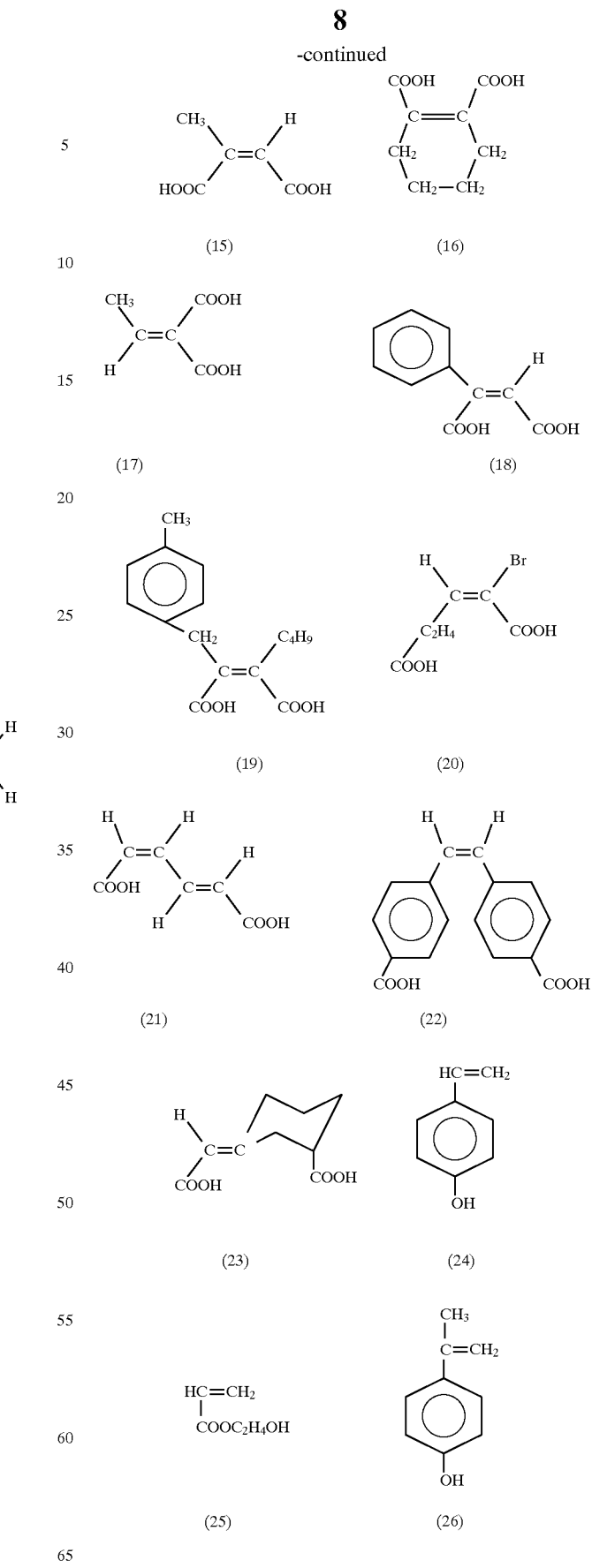

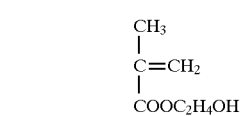
(27)

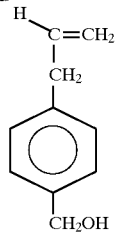
(28)

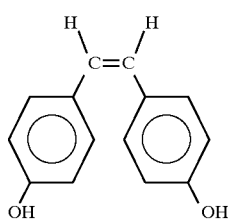
(29)

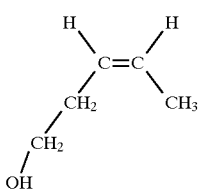
(30)

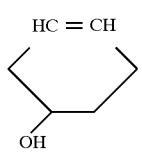
(31)

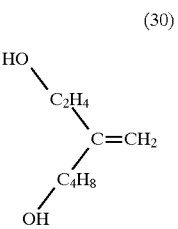
(32)

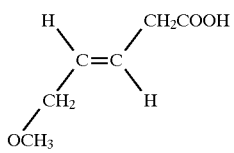
(33)

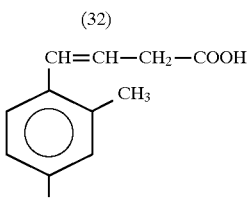
(34)

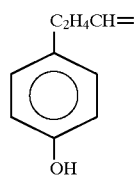

(35)

Besides the above compounds, lower alkyl esters of the above-exemplified ethylenic monocarboxylic acids, and anhydrides of the above-exemplified ethylenic dicarboxylic acids are also included.

The amount of these dually reactive compounds added to the entire starting material monomers is preferably from 0.1 to 20% by weight, more preferably from 0.5 to 10% by weight. When the amount of the dually reactive compounds is 0.1% by weight or more, the condensation polymerization reaction resins and the addition polymerization resins become compatible with each other, so that the formation of a resin having a large islands-sea structure may be likely to be inhibited, thereby leading to the prevention of orange peel surfaces.

The binder resin in the present invention may be prepared using the above starting material monomers, by the steps comprising preparing a starting material monomer mixture of two different polymerization reactions, each of the polymerization reaction being carried out in an independent reaction path, and concurrently carrying out both of the two different polymerization reactions in one reaction vessel. In the concurrent polymerization reactions mentioned above, both of the polymerization reactions do not have to proceed or terminate at the same time, and the reaction temperature and time can be suitably selected so as to proceed or terminate each reaction according to each of the reaction mechanisms.

The polymerization reaction is, for example, carried out by the method comprising the steps of adding dropwise a mixture comprising a starting material monomer and a polymerization initiator for the vinyl resins to a starting material monomer mixture for polyesters, polyesteramides, or polyamides under temperature conditions appropriate for the addition polymerization reaction, the condensation polymerization being partly carried out concurrently with the addition polymerization reaction; keeping the temperature of the obtained mixture under said temperature conditions to complete only the addition polymerization reaction; and then raising the reaction temperature to increase degree of the condensation polymerization. Here, catalysts and other additives may be suitably added.

Here, although the temperature conditions appropriate for the addition polymerization reaction may vary depending upon the types of the polymerization initiators, they are preferably from 50° to 180° C., and the optimum temperature for increasing degree of the condensation polymerization is preferably from 190° to 270° C.

In the present invention, since the condensation polymerization reaction and the addition polymerization reaction are concurrently carried out in one reaction vessel, binder resins comprising two kinds of resins effectively blended and dispersed therein may be obtained.

In the present invention, since the polymerization reactions are concurrently carried out, the resulting binder resin is a hybrid resin of two kinds of polymerization resins.

In a preferred embodiment for such a binder resin, a hybrid resin of a vinyl resin and a polyester may be suitably used.

As described above, since the binder resin obtained in the present invention is prepared by carrying out the polymerization reactions concurrently, the resulting resin has a single Tg (glass transition temperature) peak.

In the present invention, the weight ratio of the starting material monomers of the condensation polymerization reaction to the starting material monomers of the addition polymerization reaction is preferably in the range from 50/50 to 95/5, particularly from 70/30 to 90/10. The weight ratio of the starting material monomers of the condensation polymerization resin is preferably equal to or higher than the lower limit of the above range, from the aspect of providing a good weatherability. The weight ratio of the starting material monomers of the condensation polymerization resin is preferably equal to or lower than the upper limit of the above range, from the aspect of providing a good flexibility.

The binder resin thus obtained has a softening point of preferably from 80° to 140° C., more preferably from 80° to 110° C., from the aspect of providing good levelling property in the coating film. Also, the binder resin has a glass transition temperature of from 40° to 80° C., more preferably from 50° to 75° C. The glass transition temperature is preferably 40° C. or more from the aspect of obtaining good storage stability of the coating composition, and the glass transition temperature is preferably 80° C. or less from the aspect of obtaining good levelling property in the coating film.

The softening point and the glass transition temperature may be easily controlled to the above ranges by adjusting the amounts of the polymerization initiators and the catalysts in the starting material monomer mixture, or by selecting suitable reaction conditions.

Next, the crosslinking agents usable in the present invention include one or more curing agents selected from the group consisting of blocked isocyanate curing agents, epoxy curing agents, alkoxysilane curing agents, polyethyleneimine curing agents, and oxazoline curing agents.

Examples of the blocked isocyanate curing agents include blocked polyisocyanate compounds, prepared by blocking the terminus isocyanate group of such compounds as tris(2,3-epoxypropyl)isocyanate, tolylene diisocyanate, and xylylene diisocyanate, and their prepolymers with conventionally known blocking agents, such as lactam compounds and oxime compounds. Examples of the epoxy curing agents include bisphenol A diglycidyl ethers. Examples of the alkoxysilane curing agents include methoxysiloxane oligomers and ethoxysilane oligomers. Examples of the polyethyleneimine curing agents include adipic acid dihydrazide and succinic acid dihydrazide. Examples of the oxazoline curing agents include 1,4-bis(2-oxazolinyl-2)benzene and 1,2,4-tris(2-oxazolinyl-2)benzene.

The amounts of these crosslinking agents may be an amount effective for crosslinking, which may be dependent on the amounts of the functional groups present in the binder resin. More preferably, the contents of the crosslinking agents are added in an amount of from 0.8 to 1.2 equivalent of the functional groups.

The thermosetting coating composition of the present invention comprises at least a binder resin and a crosslinking agent, which may further include additives usually used in thermosetting coating compositions, such as colorants, levelling agents, crosslinking accelerating agents, and pinhole preventives.

Examples of the colorants include titanium oxide, carbon black, copper phthalocyanine, arylamide acetoacetate-based monoazo yellow pigments and pigment red. Examples of the levelling agents include acrylate polymers. Examples of the crosslinking accelerating agents include various known catalysts such as organotin compounds. Examples of the pinhole preventives include benzoins.

The contents of the above additives, based on 100 parts by weight of the binder resin are as follows: The colorant is preferably from about 10 to about 60 parts by weight; the levelling agent is preferably from about 0.1 to about 5 parts by weight; the crosslinking accelerating agent is preferably from about 0.1 to about 5 parts by weight; and the pinhole preventive is preferably about 0.1 to about 5 parts by weight.

The thermosetting coating composition of the present invention is made up of the above starting materials, and it is the form of a powder, which may be prepared by such a known method as given below.

Specifically, the above starting materials are previously mixed, and then kneaded, cooled, and pulverized. Thereafter, the obtained pulverized product is classified and subjected to an appropriate surface treatment. Here, the surface treatment is carried out to provide good free flowability of the coating, thereby giving an increased levelling property in the coating film obtained therefrom. This surface treatment may be preferably carried out by mixing in such mixers as a Henschel mixer.

The powder of the thermosetting coating composition of the present invention has an average particle size of preferably from 1 to 100 $\mu$m, more preferably from 5 to 50 $\mu$m. The average particle size of the powder is preferably 1 $\mu$m or more, from the aspect of giving good production efficiency. The average particle size is preferably 100 $\mu$m or less, from the aspect of maintaining good leveling property in the resulting coating film.

The methods of preparing a coating film by applying the thermosetting coating composition of the present invention include coating and stoving to objects to be coated by various known electrostatic coating methods and fluidized bed coating methods.

The thermosetting coating composition of the present invention is able to give a coating film having excellent gloss, levelling property, chroma, and weatherability, and also give a coating having excellent storage stability.

EXAMPLES

The present invention will be hereinafter described in more detail by means of the following working examples, without intending to restrict the scope of the present invention thereto.

The measurements for the acid values and the glass transition temperature (Tg) of each of the resulting binder resins are carried out under the conditions given below.

[Acid Value and Hydroxyl Value]

Measured by a method according to JIS K0070.

[Glass Transition Temperature (Tg)]

The glass transition temperature (Tg) refers to the temperature of an intersection of the extension of the baseline of not more than the glass transition temperature and the tangential line showing the maximum inclination between the kickoff of the peak and the top thereof as determined with a sample using a differential scanning calorimeter ("DSC Model 210," manufactured by Seiko Instruments, Inc.), at a heating rate of 10° C./min. The sample is treated before measurement using the DSC by raising its temperature to 100° C., keeping at 100° C. for 3 minutes, and cooling the hot sample at a cooling rate of 10° C./min. to room temperature.

Preparation Example 1 for Binder Resin A 762 g (7.7 mol) of methyl methacrylate and 72 g (1.00 mol) of acrylic acid as monomers for forming vinyl resins, and 22 g (0.08 mol) of dicumyl peroxide as a polymerization initiator were placed into a dropping funnel. 432 g (7.00 mol) of ethylene glycol, 312 g (3.00 mol) of neopentyl glycol, 1660 g (10.0 mol) of terephthalic acid, and 2 g (8.0 mmol) of dibutyltin oxide were placed in a five-liter four-neck glass flask equipped with a thermometer, a stainless steel stirring rod, a reflux condenser, and a nitrogen inlet tube. To the mixture contained in the glass flask, the mixture comprising the monomers for forming the vinyl resins and the polymerization initiator was added dropwise from the above dropping funnel over a period of 4 hours while heating the contents at 135° C. in a mantle heater in a nitrogen gas atmosphere and stirring the contents. The reaction mixture was matured for 5 hours while keeping the temperature at 135° C., and then the temperature was elevated to 230° C. to allow the components to react therewith.

The degree of polymerization was monitored from a softening point measured by the method according to ASTM E 28-67, and the reaction was terminated when the softening point reached 100° C.

The resulting resin had a glass transition temperature (Tg) with a single peak at 60° C. The resulting resin had an acid value of 33.0 KOH mg/g and a hydroxyl value of 10.0 KOH mg/g.

This resulting resin is referred to as "Binder Resin A."

Preparation Example 2 for Binder Resin B 1680 g (11.83 mol) of butyl methacrylate as monomers for forming vinyl resins and 25 g (0.09 mol) of dicumyl peroxide as a polymerization initiator were placed into a dropping funnel. 3010 g (8.40 mol) of polyoxyethylene(2.2)-2,2-bis(4-hydroxyphenyl)propane, 374 g (3.60 mol) of neopentyl glycol, 1044 g (9.0 mol) of fumaric acid, and 2 g (8.0 mmol) of dibutyltin oxide were placed in a ten-liter four-neck glass flask equipped with a thermometer, a stainless steel stirring rod, a reflux condenser, and a nitrogen inlet tube. The subsequent procedures were carried out under the same polymerization conditions as in Preparation Example 1.

The resulting resin had a glass transition temperature (Tg) with a single peak at 63° C. The resulting resin had an acid value of 5.0 KOH mg/g and a hydroxyl value of 65 KOH mg/g.

This resulting resin is referred to as "Binder Resin B."

Preparation Example 3 for Binder Resin C 700 g (6.74 mol) of styrene, 300 g (2.60 mol) butyl methacrylate, and 80 g (0.56 mol) of methacylic acid as monomers for forming vinyl resins, and 50 g (0.18 mol) of dicumyl peroxide as a polymerization initiator were placed into a dropping funnel. 480.0 g (4.60 mol) of neopentyl glycol, 700 g (4.21 mol) of isophthalic acid, and 2 g (8.0 mmol) of dibutyltin oxide were placed in a three-liter four-neck glass flask equipped with a thermometer, a stainless steel stirring rod, a reflux condenser, and a nitrogen inlet tube. The subsequent procedures were carried out under the same polymerization conditions as in Preparation Example 1.

The resulting resin had a glass transition temperature (Tg) with a single peak at 63° C. The resulting resin had an acid value of 35.0 KOH mg/g and a hydroxyl value of 33.2 KOH mg/g.

This resulting resin is referred to as "Binder Resin C."

Preparation Example 4 for Binder Resin D 480.0 g (4.60 mol) of neopentyl glycol, 700 g (4.21 mol) of isophthalic acid, and 2 g (8.0 mmol) of dibutyltin oxide were placed in a three-liter four-neck glass flask equipped with a thermometer, a stainless steel stirring rod, a reflux condenser, and a nitrogen inlet tube. The temperature of the reaction mixture was elevated to 230° C. to allow the components to react therewith.

The degree of polymerization was monitored from a softening point measured by the method according to ASTM E 28-67, and the reaction was terminated when the softening point reached 100° C.

The resulting resin had a glass transition temperature (Tg) with a single peak at 63° C. The resulting resin had an acid value of 35.0 KOH mg/g and a hydroxyl value of 33.2 KOH mg/g.

This resulting resin is referred to as "Binder Resin D."

Preparation Example 5 for Binder Resin E 550 mL of xylene was placed in a three-liter four-neck glass flask equipped with a thermometer, a stainless steel stirring rod, a reflux condenser, and a nitrogen inlet tube. After replacing the atmosphere with nitrogen gas, the temperature of the obtained mixture was elevated to 135° C. 500 g of styrene, 300 g of butyl methacrylate, 200 g of methacrylic acid, and 50 g of dicumyl peroxide were placed into a dropping funnel. To the mixture contained in the glass flask, the mixture in the dropping funnel was added dropwise over a period of 4 hours, and then the mixture was matured at 135° C. for 5 hours. Thereafter, the components were heated to 200° C. to distill off xylene under a reduced pressure. Subsequently, the reaction product was taken out on a vat, and after cooling the reaction product, it was pulverized. The obtained resin had a softening point measured according to ASTM E28-67 of 110° C., and a glass transition temperature (Tg) of 68° C.

500 g of the resin prepared above and 500 g of Binder Resin D prepared in Preparation Example 4 were blended in a powder state, to give "Binder Resin E."

The resulting resin had a softening point of 105° C., a glass transition temperature (Tg) of 66° C., an acid value of 28.0 KOH mg/g, and a hydroxyl value of 16.5 KOH mg/g.

Examples 1 to 7 and Comparative Examples 1 and 2

The starting materials having compositions shown in Table 1 were previously blended using a Henschel mixer, and then each of the mixture was kneaded using a Buss Ko-Kneader (manufactured by Buss (Japan) Ltd.). The kneaded mixture was cooled, and the cooled product pulverized using a pulverizer "PJM" (manufactured by Nippon Pneumatic MFG, Co., Ltd.), and the obtained product was classified using classifier "MDS" (manufactured by Nippon Pneumatic MFG, Co., Ltd.), to give a powdery product having an average particle size of 15 μm. The resulting powdery product was subjected to a surface treatment using a Henschel mixer, to give a thermosetting coating composition in a powdery form.

TABLE 1

| (Parts by Weight) | Example Nos. | | | | | | | Comp. Example Nos. | |
|---|---|---|---|---|---|---|---|---|---|
| | 1 | 2 | 3 | 4 | 5 | 6 | 7 | 1 | 2 |
| Binder Resin A | 95 | | | 92 | 90 | 95 | 93 | | |
| Binder Resin B | | 95 | | | | | | | |
| Binder Resin C | | | 96 | | | | | | |
| Binder Resin D | | | | | | | | 95 | |
| Binder Resin E | | | | | | | | | 95 |
| Curing Agent A | 5 | 5 | 4 | | | | | 5 | 5 |
| Curing Agent B | | | | 8 | | | | | |
| Curing Agent C | | | | | 10 | | | | |
| Curing Agent D | | | | | | 5 | | | |
| Curing Agent E | | | | | | | 7 | | |
| Levelling Agent | 1 | 1 | 1 | 1 | 1 | 1 | 1 | 1 | 1 |
| Titanium Oxide | 50 | 50 | 50 | 50 | 50 | 50 | 50 | 50 | 50 |

Curing Agent A: Tris(2,3-epoxypropyl)isocyanate
Curing Agent B: Bisphenol A diglycidyl ether
Curing Agent C: Methoxysiloxane oligomer
Curing Agent D: Adipic acid dihydrazide
Curing Agent E: 1,14-Bis(2-oxazolinyl-2)benzene
Levelling Agent: ACRONAL 4F (manufactured by BASF)

Test Example

Each of the thermosetting coating compositions prepared above was coated to give a coating film.

A steel plate having a thickness of 0.8 mm, which was previously subjected to degreasing treatment using an electrostatic powder coating plant, was stoved in a hot-air heating furnace at 180° C. for 20 minutes, to give a cured coating film.

Each of the resulting coating films or the coating compositions was evaluated with respect to gloss, levelling property, chroma, Erichsen value, impact resistance, storage stability of coating composition, and accelerated weatherability by the following methods.

(1) Gloss

Evaluated by a method according to JIS K-5400.

(2) Levelling Property

Evaluated by gross examination in the following three ranks:

o: Substantially no ruggedness on the surface;

Δ: Slight ruggedness on the surface; and x: Much uneven ruggedness on the surface.

(3) Chroma

Evaluated by observing the dispersion state of pigments using TEM (transmission electron microscope, "JEM-2000," manufactured by Nippon Denshi Kabushiki Kaisha (JEOL, Ltd.)) in the following three ranks:

o: Pigments are evenly dispersed, substantially free from mottling, the entire coloring being evenly bright;

Δ: Pigments are slightly unevenly dispersed, bright-dull portion being partially observed; and x: Pigments are notably unevenly dispersed, clearly a mixed state of bright portions and dull portions.

Here, the chroma is determined by the dispersion state of the white pigments. Higher the proportion of the white pigments, more dull the coloring.

(4) Erichsen value

Evaluated by a method according to JIS B-7777.

(5) Impact Resistance

Evaluated by a method according to JIS K-5400 6.13.

(6) Storage Stability of Coating Composition

Evaluated by gross examination after storing the coating composition at 40° C. for one month by the following three ranks:

o: Substantially no formation of any lumps.

Δ: Small lumps are formed, but when shaken broken and disintegrated so as to restore its original powdery state.

x: Lumps are formed, and original powdery state cannot be restored even when shaken.

(7) Accelerated Weatherability of Coating Film

Evaluated using a Sunshine Weathermeter ("WEL-SUN-BC," manufactured by Suga Shikenki Co., Ltd.). The weatherability was expressed as gloss retentive percentage (%) of the coating film measured after kept standing for 500 hours.

The results for each evaluation are summarized in Table 2.

As is clear from the results in Table 2, the coating films prepared from the thermosetting coating compositions of Examples have excellent gloss, levelling property, and weatherability, and the coating compositions have excellent storage stability. On the other hand, in the case of Comparative Example 1 where the binder resin comprises a polyester alone, the above properties cannot be achieved to a sufficient level, and particularly in the case of Comparative Example 2 where the binder resin comprises a mixture of styrene-acrylic resin and a polyester, these properties are drastically poor.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A thermosetting coating powder composition comprising:

(a) a binder resin composition prepared by the steps comprising mixing in one reaction vessel, starting material monomers to produce vinyl resins by addition polymerization, and starting material monomers to produce one or more polymers selected from the group consisting of polyesters, polyesteramides and polyamides by condensation polymerization and concurrently carrying out said addition polymerization and said condensation polymerization;

(b) a colorant; and (c) a crosslinking agent.

2. The thermosetting coating composition according to claim 1, wherein said binder resin is a hybrid resin of a vinyl resin and a polyester.

3. The thermosetting coating composition according to claim 2, wherein said hybrid resin has a single Tg peak.

4. The thermosetting coating composition according to claim 1, wherein the weight ratio of monomers of the condensation polymerization reaction to monomers of the addition polymerization reaction is in the range of from 50/50 to 95/5.

5. The thermosetting coating composition according to claim 1, wherein said starting material monomer mixture contains a compound which is able to react with both monomers of the addition polymerization reaction and monomers of the condensation polymerization reaction.

6. The thermosetting coating composition according to claim 5, wherein said compound which is able to react with

TABLE 2

|  | Example Nos. | | | | | | | Comp. Example Nos. | |
| --- | --- | --- | --- | --- | --- | --- | --- | --- | --- |
|  | 1 | 2 | 3 | 4 | 5 | 6 | 7 | 1 | 2 |
| Gloss | 99 | 98 | 100 | 100 | 98 | 99 | 96 | 78 | 72 |
| Levelling Property | ○ | ○ | ○ | ○ | ○ | ○ | ○ | Δ | × |
| Sharpness | ○ | ○ | ○ | ○ | ○ | ○ | ○ | Δ | × |
| Ericsen Value (3 mm) | >7 | >7 | >7 | >7 | >7 | >7 | >7 | >7 | >7 |
| Impact Resistance (cm) | >50 | >50 | >50 | >50 | >50 | >50 | >50 | >50 | >50 |
| Storage Stability of Coating Composition | ○ | ○ | ○ | ○ | ○ | ○ | ○ | ○ | Δ |
| Accelerated Weatherability of Coating Film (Gloss Retentive Rate %) | 90 | 85 | 82 | 80 | 77 | 80 | 90 | 62 | 48 | both the starting material monomers of the addition polymerization reaction and the starting material monomers of the condensation polymerization reaction is one or more compounds selected from the group consisting of compounds represented by the general formula (I) shown below:

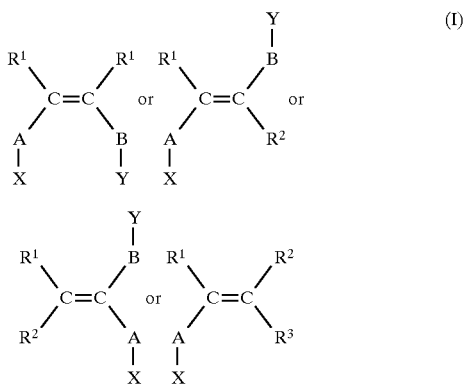

wherein $R^1$, $R^2$ and $R^3$, which may be identical or different, each represents hydrogen atom, hydroxyl group, an alkyl group, an alkoxyl group, an aryl group, a vinyl group, or a halogen atom, which may together form a ring, each of the alkyl group, the alkoxyl group, the aryl group, the vinyl group, or the ring being substituted or unsubstituted; A and B, which may be identical or different, each represents a single bond or an alkylene group represented by the following general formula (II) or a phenylene group represented by the following general formula (III):

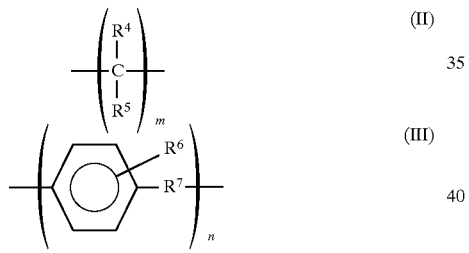

wherein $R^4$, $R^5$ and $R^6$, which may be identical or different, each represents hydrogen atom, hydroxyl group, an alkyl group, an alkoxyl group, an aryl group, a vinyl group, or a halogen atom, wherein $R^4$ and $R^5$ may together form a ring, each of the alkyl group, the alkoxyl group, the aryl group, the vinyl group, or the ring being substituted or unsubstituted; $R^7$ represents a single bond or a lower alkylene group;

m is an integer of 0 to 5; and n is an integer of 0 to 2, and wherein X and Y, which may be identical or different, each represents —$R^8$, —$OR^9$, or —$COOR^{10}$, wherein $R^8$, $R^9$, and $R^{10}$ each represents hydrogen atom or a substituted or unsubstituted lower alkyl group.

7. The thermosetting coating composition according to claim 5, wherein said compound which is able to react with both the starting material monomers of the addition polymerization reaction and the starting material monomers of the condensation polymerization reaction is added to the entire starting material monomers in an amount of from 0.1 to 20% by weight.

8. The thermosetting coating composition according to claim 1, wherein said crosslinking agent is one or more curing agents selected from the group consisting of blocked isocyanate curing agents, epoxy curing agents, alkoxysilane curing agents, polyethyleneimine curing agents, and oxazoline curing agents.

9. The thermosetting coating composition according to claim 1, wherein the thermosetting coating composition in the powdery form has an average particle size of from 1 to 100 μm.

10. A coating film prepared by curing the thermosetting coating composition according to claim 1.

11. A method of preparing a coating film which comprises applying the thermosetting coating powder composition according to claim 1 to an object to be coated and curing said coating powder composition.

12. The method according to claim 11, wherein said applying is by electrostatically coating.

13. The method according to claim 11, wherein said applying is by fluidized bed coating.

14. A thermosetting coating powder composition comprising:

(a) a binder resin composition prepared by the steps comprising adding in one reaction vessel, starting material monomers to produce vinyl resins by addition polymerization to starting material monomers to produce one or more polymers selected from the group consisting of polyesters, polyesteramides and polyamides by condensation polymerization; concurrently carrying out addition polymerization and condensation polymerization; and raising the temperature to increase the condensation polymerization;

(b) a colorant; and (c) a crosslinking agent.

* * * * *